Sept. 9, 1952  C. F. MZIK  2,609,958
BASKET-LIKE DEVICE AND METHOD OF MAKING SAME
Filed April 8, 1948  2 SHEETS—SHEET 1

INVENTOR.
Charles F. Mzik
BY
ATTORNEYS

Sept. 9, 1952             C. F. MZIK             2,609,958
BASKET-LIKE DEVICE AND METHOD OF MAKING SAME
Filed April 8, 1948             2 SHEETS—SHEET 2
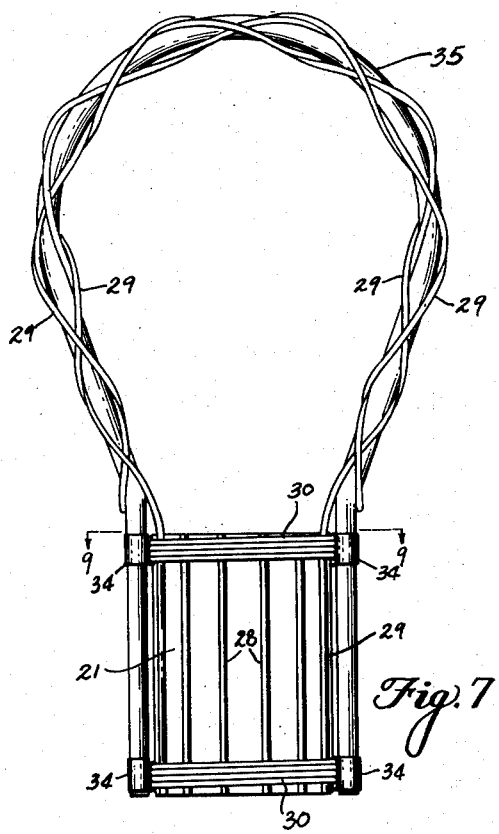
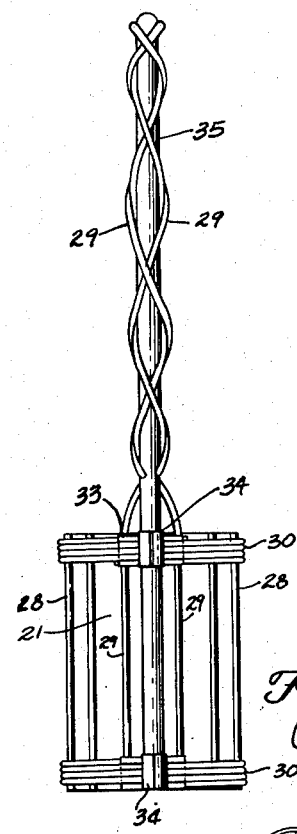
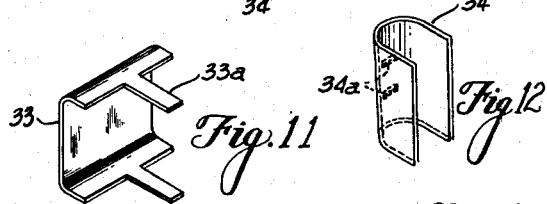
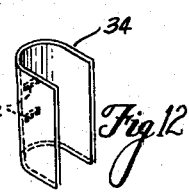
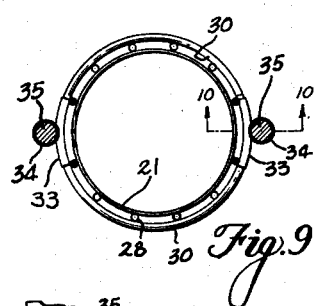
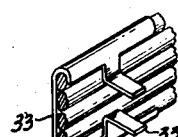
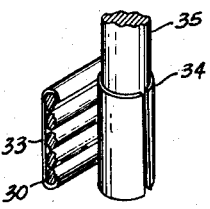
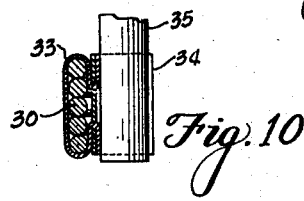
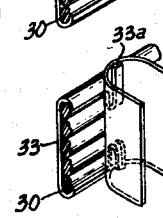
INVENTOR.
Charles F. Mzik.
BY Woodling & Krost,
Attorneys Patented Sept. 9, 1952

2,609,958

UNITED STATES PATENT OFFICE 2,609,958

BASKET-LIKE DEVICE AND METHOD OF MAKING SAME

Charles F. Mzik, Chagrin Falls, Ohio

Application April 8, 1948, Serial No. 19,713

7 Claims. (Cl. 217—122)

My invention relates to basket-like devices and to the process of making the same.

An object of my invention is to provide an improved structure, and improved method of making the same, of a basket-like device having advantages of use, appearance, efficiency and economy not heretofore obtainable.

Another object is to provide a device and method of making the same which has all of the advantages of an orthodox basket, and at the same time avoids the laborious and slow weaving and other hand work inherent in prior baskets and in the manner of making them.

Another object is to provide for a basket-like device which incorporates a container in such manner as to make the container a fixed part of the assembly.

Another object is to provide and make a basket-like device in which the cradle of reed or similar substance for accommodating a container, such as a flower container, is firmly secured to, and mounted upon, the container.

Another object is to provide a novel and attractive structure in a basket-like device so made that there is economy in the labor required for making the device and in the material required for the structure.

Another object is to mechanize the making of basket-like devices.

Another object is for the taking advantage of certain inherent characteristics of reed and similar material in the making of a structure of such reed or similar material.

Another object is to provide improved elements and parts for a basket-like device.

Other objects and a fuller understanding of the invention may be had by referring to the following description and claims, taken in conjunction with the accompanying drawings, in which:

Figure 7 is a side view of my completed basket-like device with the handle portion added thereto;

Figure 8 is a side view of the basket-like device shown in Figure 7 and looking in the direction of the arrows 8—8 of Figure 7, that is, at right angles to the view of Figure 7;

Figure 9 is a cross-sectional view of the device shown in Figure 7 looking in the direction of the arrows 9—9 of Figure 7;

Figure 10 is an enlarged view partially in section through the line 10—10 of Figure 9;

Figure 11 is an enlarged perspective view of a clip used in securing the circumferential or binding reeds of my device;

Figure 12 is an enlarged perspective view of the handle clasp which is assembled with the clip of Figure 11;

Figure 13 is a view of the clip shown in Figure 11 formed to secure together the circumferential reeds;

Figure 14 shows the assembly of the clasp of Figure 12 to the clip illustrated in Figure 13;

Figure 15 shows the handle member mounted in the clasp by the forming of the clasp around the handle member.

Figure 1:
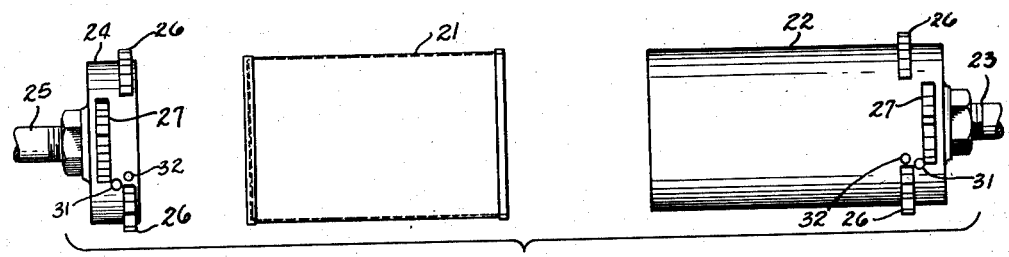
Figure 1 is a side view of the form mandrels utilized in making my device and carrying out my new process, and shows a container positioned between the two mandrels, the mandrels being spaced apart in this view.

In my improved basket-like device I utilize a container 21 which is preferably cylindrical in form, open at one end and closed at the other end, and preferably a container made of sheet metal and commonly referred to as a can. Such a container is shown in Figure 1 and has its open end directed to the right and its closed end directed to the left. There is a bead or circumferential flange at the opposite ends of the container 21.

A mandrel 22 of cylindrical form is shown on the right-hand end of Figure 1. The cylindrical form of mandrel 22 is such that it will fit into and substantially fill the interior cavity of container 21. The external wall of mandrel 22 fits somewhat closely in juxtaposition to the internal wall of the container 21, so as to support the walls of the container 21 from collapsing or bending to an appreciable degree upon the application of external and radially directed force on the container 21. The fit of the mandrel 22 in the container 21 is such, however, that the container 21 may be readily slid on and off of the cylindrical portion of mandrel 22. The mandrel 22 is carried by a centrally disposed shaft 23, so that mandrel 22 will rotate with shaft 23 upon rotation of the shaft 23 by external suitable means not shown.

A plurality of clips or catches 26 are disposed around the circumference of mandrel 22 near its right-hand end, and there are similar clips or catches 27 adjacent the right-hand end of mandrel 22. The clips or catches 27 are substantially the same as those marked by the reference character 26, except that it is preferred to have clips or catches 27 arranged or marked so as to be readily distinguishable from clips or catches 26. One means of distinguishing between them is illustrated in Figure 1, in that clips or catches 27 are not aligned with clips or catches 26 by being positioned closer to the right-hand end of mandrel 22.

Figure 2:
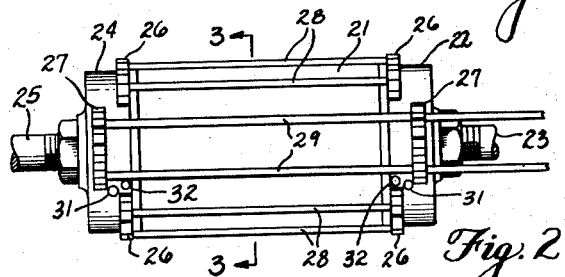
Figure 2 is a side view of the parts shown in Figure 1 wherein the mandrels are moved together with the container positioned on the right-hand mandrel. This view also shows longitudinal reed members positioned in place on the assembly.
Figure 5:
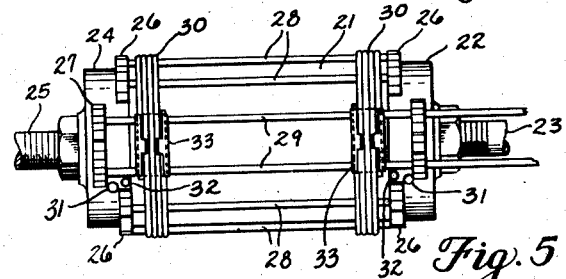
Figure 5 is a view somewhat similar to that of Figure 2, and shows the assembly after circumferential or binding reeds have been wrapped around the assembly of container and longitudinal reeds, and with the ends of the circumferential reeds secured by a clip.

At the left-hand of Figure 1 there is shown a mandrel or block member 24 which complements the mandrel 22 by abutting against the closed bottom end of container 21 when mandrel 22 and 24 are moved toward each other with the container 21 therebetween. Upon the sliding of container 21 over mandrel 22 and the bringing of mandrel or block member 24 hard up against the bottom of container 21, the parts are frictionally held together so that mandrel 22, container 21 and mandrel 24 can rotate as a unit. A shaft 25 at the left-hand end of mandrel 24 rotatably supports the mandrel 24. The whole assembly shown in Figures 1, 2 and 5 is thus rotatable as a unit upon rotation of either shaft 23 or shaft 25. Upon rotation of shaft 25, then the shaft 23 is free to rotate therewith, or upon rotation of shaft 23, then shaft 25 is free to rotate therewith. A suitable driving mechanism and motor not shown is used for rotating the assembly on a lathe or other suitable turning machines.

Mandrel or block member 24 also has clips or catches 26 which may be aligned with the clips or catches 26 on mandrel 22. It also has clips or catches 27 which may be aligned with clips or catches 27 on mandrel 22. Also on mandrel 24 the clips 27 are distinguishable from clips 26 by the arrangement shown.

Figure 3:
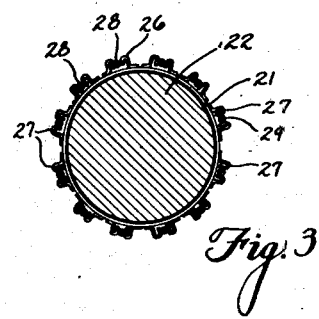
Figure 3 is a cross-sectional view of the view shown in Figure 2 looking in the direction of the arrow 3—3 of Figure 2.

A plurality of straight reeds or reed-like members approximating the length of the container 21 are then provided by cutting reed or similar materials into suitable lengths. These straight reeds or reed-like members are denoted by the reference character 28. The reed members 28 are placed longitudinally of the container as shown in Figures 2, 3 and 5, and the ends of the reed members 28 are placed or caught in the resilient clips 27 so as to hold the members 28 temporarily in the position shown in Figures 2 and 3.

Other reeds or reed-like members denoted by the reference character 29 are disposed longitudinally of the container 21 and temporarily secured in place by pressing them into the resilient clips 27 on mandrels 22 and 24. Because members 29 may be used for twining or otherwise embracing a handle of the basket-like device they are preferably left longer than members 28, and to distinguish between them members 28 may be referred to as short longitudinal members and members 29 may be referred to as long longitudinal members. In the embodiment shown there are eight reed members 28 and four reed members 29 arranged longitudinally of container 21 and substantially equidistantly spaced around the circumference of container 21 as shown in Figure 3. The long ends of members 29, that is, the right-hand end in Figure 2, may be looped or twisted or otherwise disposed of during the forming of the body of the basket-like device, the extreme right-hand ends of members 29 not being fully shown in Figures 2, 5 and 6.

It is to be understood that the clips or catches 26 and 27 on mandrels 22 and 24 are for the purpose of temporarily holding the longitudinal reed members 28 and 29 in proper position relative to container 21 during the assembly and fabrication of the body portion of the basket-like device. The resiliency of the clips or catches 26 and 27 is such that the reed-like members 28 and 29 may be readily inserted and removed manually from the clips, the grasp of the clips being only sufficient to hold the reed-like members in proper alignment and to prevent them from falling out of the clips during the fabrication of the body of the basket-like device.

One or more binding or circumferential reed-like members 30 are provided for winding around the assembly of container and longitudinal reed members. Like the longitudinal reed members the binding member 30 may be of reed material or other suitable material having the proper characteristics for the purposes herein set forth, and in this description and claims the member 30 may be referred to as a reed member or reed-like member. In the embodiment shown in the drawing I use two different members 30, one near the upper portion of container 21 and one near the bottom portion of container 21. However, only one reed member 30 may be utilized, and also more than two members 30 may be utilized. For example, one member 30 may be wound along a substantial or entire portion of the length of the container 21 from one end to the other, and also three or four or more different members 30 may be wound around the container at spaced locations along the length of the container.

Each mandrel has a suitable securing means for holding an end of member 30 during the time that member 30 is wound around the assembly. One suitable means for anchoring temporarily an end of member 30 is provided by a small hole 31 extending into mandrels 22 and 24 at a suitable location for accommodating an end of a reed-like member 30. A peg or nail 32 is located near the hole 31 and near the location where the winding of member 30 is to commence. A free end of member 30 is inserted in the hole 31 and then looped around peg 32 to temporarily anchor it and roughly position it for the winding operation. The initial turn of member 30 around the assembly is illustrated in the Figure 4.

The reed-securing clips 33 are positioned adjacent the assembly in proper position as shown. The member 30 is wound around the clips 33 as part of the assembly of container and longitudinal reed members. With the clips 33 in position the winding of the member 30 is commenced by rotation of the whole assembly. This rotation is accomplished by suitably turning shaft 23 or shaft 25, the other shaft being free to rotate therewith. As the assembly is rotated by appropriate driving means, the unwound end of reed-like member 30 is held back tangentially of the cylindrical assembly so as to put a yieldable resistance to the turning action and to firmly and tightly cause the reed-like member 30 to wind around the assembled elements.

Figure 4:
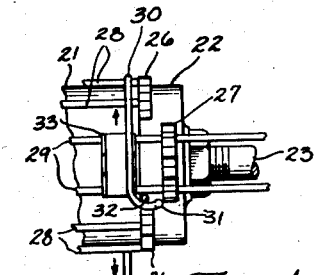
Figure 4 is a view of the right-hand end of the assembly shown in Figure 2 and shows the beginning steps of winding the circumferential or binding reed around the longitudinal reeds and container.

Between the force exerted by the rotation of the assembly and the resistance provided to the winding of member 30 around the assembly, the longitudinal reed members 28 and 29 are tightly compressed and forced against the container 21. In Figure 4 the arrow indicates the backward pull or resistance offered to member 30 as it is wound around the assembly. Of course, the resistance or backward holding on the end of member 30 yields to, or is overcome by, the turning of the assembly on shafts 23 and 25, so that the winding of member 30 proceeds as the assembly is rotated. Inasmuch as the winding action on the opposite ends of the container 21 is substantially the same, the detailed description of the operation of winding both members 30 is not repeated.

The pressure of reed-like members 30 on the longitudinal reed-like members 28 and 29 is such that the engaging surfaces where the members 30 lap over or cross the longitudinal reed-like members are partially dented, squashed or compressed. The nature of reed or material having comparable characteristics is such that upon the application of force there is this partial indentation. This is particularly true when the reed or other similar material has been dampened or saturated with water so as to make it somewhat soft, and I prefer to so soften my reeds or reed-like materials prior to the assembly herein described. The pressure of the members 30 on the opposites ends of reed-like members 28 and 29 where the overlapping or crossing occurs, is such as to press the longitudinal members firmly inward against the container 21. This inward pressure also slightly disforms the longitudinal members at their engagement with the container 21, and particularly under the binding members 30. By this means members 30 and 28 and 29 are all firmly secured and held to the container 21.

The binding members 30 are wound around the assembly a suitable number of times, and in the preferred embodiment illustrated each member 30 is wound around four laps or turns. A clip 33 is positioned on opposite sides of container 21 under the member 30 as illustrated. The binding members 30 overlap approximately the length of a securing clip 33. Thus, within a securing clip 33 on the side where the ends of member 30 meet, there would be five thicknesses of the binding members 30. After each member 30 is properly wound around the desired number of times the clips 33 are bent inwardly and downwardly as shown so as to firmly clamp or secure the turns of the binding members 30 together and to secure the ends thereof against unwinding or slipping. After so securing the clips 33 to the binding member 30 to firmly hold it in place and in wound position, the ends of the binding member 30 adjacent the ends of a clip 33 on one side of the container are cut by a knife or other suitable means. Thus, the end which was secured in hole 31 is cut off to leave the beginning end of member 30 adjacent a clip 33. Also the end that was being wound is cut off by a knife or other suitable means at the other end of the same clip 33 to provide the arrangement shown in Figure 5.

The detailed structure of a securing clip 33 before deformation to secure the member 30 is shown in Figure 11. It is in the form of a channel arranged to accommodate the desired number of turns of member 30 between the side walls. The side walls of the channel are formed with prongs or tongues 33a, as shown in Figure 11. Upon deforming or bending of clip 33 around member 30 the parts assume the position shown in Figure 13, whereby the clamping of the required number of turns of member 30 is accomplished. The clip 33 shown will accommodate four of five turns, the walls being bendable to provide for clamping either number of turns. Other sizes and arrangements may be made and, if desired, the clips for opposite sides may be of different size and arrangement. A handle clasp 34 as shown in Figure 12 is provided for securing a long handle 35 to the body portion of the basket-like device. This clasp 34 is formed as a channel with an arcuate cross section, and has two spaced holes 34a formed therein as shown in Figure 12. These small holes 34a are to accommodate the prongs 33a.

The clamp 34 is assembled to the clip 33 by moving the prongs 33a into the holes 34a, and by then turning back the prongs 33a as shown in Figure 14 to firmly secure the clasp 34 to the clip 33.

The assembling of clasp 34 to clip 33 may be done prior to or after the assembly of container, longitudinal reed-like members and binding members have been removed from the mandrels 22 and 24. If desired the clasp 34 may be assembled while the parts are in the position shown in Figure 5, or if desired the clasp 34 may be assembled after removal of the parts shown in Figure 5 from the mandrels.

Figure 6:
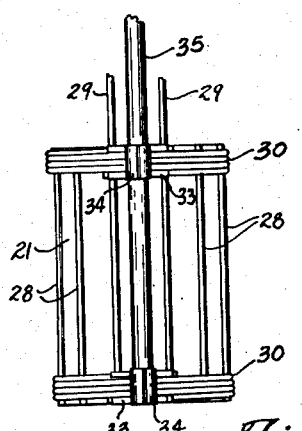
Figure 6 is a view of the basket-like device formed as in Figure 5 and illustrates the device after removal from the mandrel forms upon which it was made.

The container 21 having firmly bound thereto the longitudinal reed members 28, 29 and the binding members 30, is then removed from the mandrels 22 and 24 by moving the mandrels back away from each other as in their initial position of Figure 1. The container 21 slides off of the cylindrical form of mandrel 22 and the reed-like members bound thereto are carried with it. At this point, the form of the body of the basket-line device is substantially like that shown in Figure 6. In the event that there are any irregularities in the length of members 28, this may be corrected by cutting off long ends. If the clasp 34 has not previously been secured to clip 33, they are so assembled to the body of my device as shown in Figure 6.

It is preferable to have a handle member secured to the body thus formed for my device. In the embodiment shown I use a standard loop handle 35 of reed, willow or other similar material. Each end of the handle 35 is secured in the clasps 34 by deforming the clasps 34 around the handle 35 to the position shown in Figures 6 and 15. The compression of clasp 34 on handle 35 is such that the handle 35 is firmly secured to the body of my basket-like device. The long ends of reed-like members 29 extending from the body of my basket-like device may then be wound or entwined around the handle member 35 to give the usual basket-like effect illustrated in Figures 7 and 8.

Although my invention is directed to the novel structure of, and method of making, the body of my basket-like device, I show the complete assembly in Figures 7 and 8. While the device has a superficial appearance of the usual woven basket, it is to be noted that all the usual art craft and hand weaving required in the usual baskets has been omitted. My basket-like device is machine made at a rapid rate and with a great saving in material and labor. It is to be noted that the container 21 in the device of Figures 7 and 8 has become part of the unit and is not readily removable. Indeed, the container becomes necessary for the support of the body structure. The container 21 will not fall out of my device, as it is held by the body.

For ornamental purposes, the lower ends of the longitudinal members 28 and 29 shown in Figures 7 and 8 may be made somewhat longer than container 21 to extend downwardly to provide an ornamental base protruding down from the container 21. Other additions and variations may be added for securing different ornamental appearances and effects.

A detail of the structure of my body device is shown in Figure 9 which is a cross-sectional view along the line 9—9 of Figure 7. A further structural detail is shown in Figures 9 which is a cross-sectional view through the line 10—10 of Figure 9.

It is generally desired to have many variations in form and appearance of devices of this nature, and my invention lends itself very well to providing these different forms and appearances. Changes in the securing means herein illustrated as described may be made in structure and appearance, but within the inventive concept herein disclosed. Changes in, or elimination of, the handle arrangement shown may of course be accomplished without losing the advantage of the new structure and method of making the body of the basket-like device here shown and described.

Although the invention has been described with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A basket-like device comprising in combination a container, a plurality of longitudinal compressible reed members disposed longitudinally of said container at intervals around, and next adjacent to the outer longitudinal walls of, said container, said longitudinal reed members following the contour of the container without recurrent intervention of interwoven reed members therebetween, a circumferential reed member disposed completely around said container and longitudinal reed members transversely of, and in compressed engagement with, said longitudinal reed members, said longitudinal reed members being tightly compressed against said container and being compressibly interlocked with said circumferential reed member, and a securing member securing said circumferential reed in compressed engagement with said longitudinal reed members.

2. A basket-like device comprising a relatively rigid container of round form, a plurality of straight reed members disposed around, outwardly of, and longitudinally of said container, said straight reed members being uninterruptedly adjacent the outer wall of the container along their common extent, a binding reed member disposed circumferentially around the container and all of said straight reed members without interweaving of the binding reed member with said straight reed members and compressibly binding said straight reed members to said container and said binding reed member to said straight reed members, said binding reed member overlying all said straight reed members at the points of engagement therebetween, and securing means for securing said binding reed member in said circumferential disposition.

3. The combination of a container, a plurality of non-undulating rib members of reed-like material disposed longitudinally of the container and spaced substantially equidistantly around the periphery of said container, said rib members being in engagement with said container substantially throughout the length of the respective rib members, a binding member of reed-like material disposed around the periphery of the container and transversely of said rib members and compressibly binding said rib members to said container and said binding member to said rib members, and a metallic clip member engaging the opposite end portions of said binding member to secure the binding member in said compressingly binding position.

4. The combination of a metal can, a plurality of longitudinal straight reeds disposed around the periphery of the can in contact with the wall thereof throughout the common extent of said longitudinal reeds and can and extending longitudinally of the can, a binding reed wound around the assembly of can and longitudinal reeds and firmly binding the longitudinal reeds to said can, and a metal clip clamping said binding reed to itself to hold the binding reed in firm bond on said assembly.

5. The combination of a container, a plurality of ribs of reed-like compressible material disposed around the periphery of the container in contact with the wall thereof substantially throughout their lengths and extending longitudinally of the container, a binding member wound around the assembly of container and ribs and compressing said ribs and firmly binding the ribs to said container, said ribs being disposed radially inward of said binding member throughout the length of said ribs, a securing member engaging said binding member to secure the same in said compressibly binding condition, and a handle member secured to said securing member.

6. A device comprising in combination, a round body member, a plurality of straight reed members disposed longitudinally of, and arranged at intervals around the circumference of, said body member, said straight reed members conforming to the outer wall of the body member throughout their length, a plurality of circumferential reed members wound around the assembly of body member and straight reed members in tight compression with said straight reed members, said straight reed members being arranged radially inward of the circular path of said circumferential reed members throughout the length of the straight reed members, said straight reed members being firmly pressed in tight engagement with said body member by said circumferential reed members, a plurality of securing members securing said reed members, respectively, in said wound disposition, handle means having portions disposed longitudinally of, and adjacent, said circumferential reed members, said portions being secured to said securing members.

7. The method of making a basket-like device comprising the steps of: providing a container of round cross section; temporarily securing a plurality of reed-like members in positions axially of, and at intervals around the circumference of, said container; temporarily anchoring an end of a binding member relative to said assembly of container and reed-like members; rotating said assembly; yieldably resisting winding of said binding member around said assembly to tightly wind the binding member around the said assembly and to compress said reed-like members; and securing the said binding member in said tightly wound position.

CHARLES F. MZIK.

REFERENCES CITED

The following references are of record in the file of this patent:

UNITED STATES PATENTS

| Number | Name | Date |
| --- | --- | --- |
| 176,952 | Hare | May 2, 1876 |
| 1,178,924 | Johnson | Apr. 11, 1916 |
| 1,243,079 | Lloyd | Oct. 16, 1917 |
| 1,243,082 | Lloyd | Oct. 16, 1917 |
| 1,701,312 | Shearer | Feb. 5, 1929 |
| 1,704,876 | Weber | Mar. 12, 1929 |

FOREIGN PATENTS

| Number | Country | Date |
| --- | --- | --- |
| 154,760 | Great Britain | Dec. 9, 1920 |